July 28, 1925.

R. D. FAY

APPARATUS FOR SOUNDING

Filed May 2, 1921

INVENTOR:
Richard D. Fay
By
ATTORNEYS:

July 28, 1925.

R. D. FAY 1,547,574

APPARATUS FOR SOUNDING

Filed May 2, 1921

INVENTOR:
Richard D. Fay

By
ATTORNEYS:

Patented July 28, 1925.

1,547,574

UNITED STATES PATENT OFFICE.

RICHARD D. FAY, OF NAHANT, MASSACHUSETTS, ASSIGNOR, BY MESNE ASSIGNMENTS, TO SUBMARINE SIGNAL COMPANY, OF BOSTON, MASSACHUSETTS, A CORPORATION OF MAINE.

APPARATUS FOR SOUNDING.

Application filed May 2, 1921. Serial No. 466,353.

*To all whom it may concern:*

Be it known that I, RICHARD D. FAY, of Nahant, in the county of Essex and State of Massachusetts, a citizen of the United States, have invented a new and useful Improvement in Apparatus for Sounding, of which the following is a specification.

I have made a new and useful improvement in means for determining the depth of water beneath a floating body such as a ship. In one method, which has been described and used to a limited extent in the past, a sound impulse is created and a mechanism is provided whereby the time taken for the sound to reach the bottom and be reflected back to the ship can be measured and the depth thus calculated. This device can be used successfully when great depths of water are to be measured and, consequently, the time between the emission and the reception of the signal is fairly long. The device, however, has been found unsatisfactory for use in shallower water, where soundings are of greatest importance.

Another form of acoustical sounding device, which has been used in the past, is one in which the direction is ascertained from which a sound, reflected from the ocean's bottom, reaches the sound receiving device, the source of sound being at a known distance from the sound receiver. This device is objectionable on account of the inaccuracies which result from the limited separation between the sound sending and sound receiving devices, imposed by the necessity of mounting both upon a ship, upon the effect of irregularities in the surface of the ocean's bottom, and upon the skill required in ascertaining the angle of the direction from which sounds are coming.

The device which I have invented is free from the objectionable features inherent in all other known devices, as with it I am able to measure all depths of water and, regardless of the character of the ocean bottom, obtain accurate measurements of depth without requiring the services of trained observers.

The method which I employ is one in which the time of travel of sound waves to the bottom and back is employed and is novel in that I employ two paths between the source of sound and the receiving indicator. One path which may be either electrical or acoustical is between the sound source and the indicator device and does not include the water beneath the ship; the other is to the water, through the water to the ocean bottom and back to a sound receiver, and from the sound receiver to the indicator. The first path, i. e. from the sound source to the indicator is usually entirely on shipboard and the time of travel of waves over this path can be easily known and calibrated. The time of travel over that portion of the second path between the sound receiver and the indicator is negligible. The time of travel, therefore, in the second path is dependent only upon the depth of water beneath the ship, and the depth is determined by comparing the time of travel of the sound from the source along the two paths.

It is possible to utilize the time of travel of waves over the two paths, which I have devised by employing with the path to the bottom and back a direct path over which the line of travel is variable between the source and the indicator, and to use as a source of the sound which travels over both paths, a sound impulse such as might be produced by an explosion or discharge, or by the collapse of an evacuated bulb, or by a blast from an oscillator or from a similar device, as was done by Fessenden in the method of sounding first referred to above. (See his Patent No. 1,217,585). In such an arrangement as I propose (the imparted energy preferably originating below the water line) the time of travel over the direct path would be varied until the arrival of the same sound impulse over the two paths would coincide. It becomes thereafter a simple matter to measure the equivalent water length of the first, or inboard path, and to calculate or record directly the depth of water beneath the ship.

I have found it of distinct advantage in a sounding device to use separate instruments for sending and receiving and to locate such instruments in the ship in such a way that no sound is carried from one to the other by any other than the two paths above described.

By such an arrangement, I have been able to overcome one of the most serious difficulties which has been found in the use of a method in which the time of sending and the time of receipt of the reflected sound wave is measured. When the same device is used both for sending and receiving, it has been found that the sound producing device cannot be made so highly damped that when the time intervals are small, as is the case when the water is shallow, the sound of the sending signal does not overlap that of the received signal. It is thus impossible to distinguish the reflected sound wave from the producing wave.

In my arrangement, I transmit in any suitable manner, the sound waves produced by the sender directly to the indicator, so that all characteristics of the waves produced by the sender are transmitted by both paths. The result of this arrangement is that, even if the motion of the sound producer persists, owing to the elasticity of its parts or for any other reason, the characteristics of the waves in both paths are the same and can be made so to combine at the indicator that no inaccuracies result.

Again, I have found it of distinct advantage (though not essential) to use a source of continuous sound waves and to create some characteristic and easily recognizable change at controllable and easily measurable intervals. When this method is employed, the length of the interval between changes is made such that the sound wave or waves resulting from the first change will reach the indicator over the water path at the same time that the second or a succeeding change reaches the indicator over the first or non-water path. The indicator shows when the changes of sound of the first change reach it over the water path at the same time that the sounds of the second change reach it over the more direct path. If the interval between these changes is known, the length of the water path and hence the depth of the water beneath the ship can be readily ascertained. Thus the depth is a function of the length of the interval between changes and, as the length of the interval is controllable, varying depths can be quickly and accurately determined.

I have used several methods of producing these characteristic and readily recognizable changes. One way of accomplishing these changes, which is simple and has certain advantages, is to vary the intensity of the waves produced by the sound source at intervals which can be varied at will. A distinct advantage of using such a method arises from the fact that as the sound source is always tuned to a definite pitch, receiving devices and tuned circuits can be used with the result that greater effects can be made upon the indicator for the same expenditure of energy, or smaller energy is required to produce the same effect upon the indicator. In this arrangement there is, therefore, a sound wave of constant pitch which at controllable intervals increases for an instant in intensity. The sound waves thus correspond to the "carrier current" waves which has been used in wireless telephoning and these "carrier current" waves are intensified above the normal waves at controllable and known intervals of time.

Another method which I have used is similar to the above except that instead of increasing the intensity of the sound at controllable intervals, I retain the intensity the same but change the frequency and so change the pitch of the sound at intervals as may be desired. The percentage change is not large and the duration of the variation period is extremely limited. The note produced during the variation period will be out of tune with the normal frequency at the indicator, at all times, except those in which the time of travel of the sound waves to the ocean bottom and back is an exact multiple of the period between variations. The indicator shows when waves are in tune or when out of tune and means are given to the observer whereby the interval between the periods of frequency changes is lengthened or shortened until the frequency changes in the two sets of waves occur simultaneously.

As an illustration of my invention I describe below electrical apparatus all of a character well known by which it may be carried out, but I do not mean to limit myself to such apparatus, for it will be understood by those skilled in the art that such a method may be carried out by acoustical (i. e. mechanical) apparatus or by a combination of acoustical and electrical means.

Such apparatus is shown diagrammatically in the drawings, in which—

Figure 1 shows a simple form of apparatus for the purpose and

Figure 2 a more elaborate form.

In describing the connections between the various instruments, by which indications of sound may be conveyed, I use below the word "path" or "paths" without necessarily meaning to differentiate between mechanical (i. e. acoustical) and electrical connections; for such indications may be conveyed by either means, according to the kind of apparatus used, and in carrying out my method I utilize only the sound indications which travel by such paths.

Figure 1:
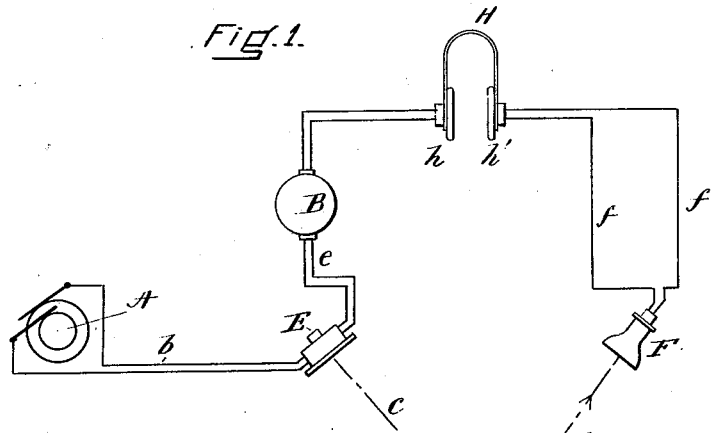

Figure 1 illustrates the simplest arrangement embodying the fundamental principle of my invention. A is a source of power which is conducted in any suitable manner, such as by wires $b$, to the submarine sound producing device E. Such for example as a Fessenden oscillator. Sound producer E creates underwater waves of sound which pass through the water, for example, by path c to the ocean bottom G, where the waves are reflected and pass up through the water by path d to sound receiver F, such as a microphone. The sound waves then pass by path f from F to the indicator H, shown as a head piece. I provide a second path e from the sound producer E to the indicator H. In path e a modulator B is inserted by means of which the time that any particular sound will reach the indicator H can be controlled. This modulator consists of an electrical or adjustable mechanical pneumatic device, such as a compensator of ordinary and well known construction, by means of which the time of travel of the sound waves can be increased or decreased until the time required for the sound to travel from E to H by path e is equal to that which is required for it to travel by path c d f. When the sounds over these two paths are equalized in times of arrival at H, the length of the two paths must be equal and a calibration on the modulator or compensator B will show the depth of water beneath the ship. Any suitable form of indicator can be used to note the simultaneous arrival of the sound waves at the indicator. Probably the simplest way of accomplishing this is by means of a head piece, one member $h$ of which is connected to the path e to one ear and the other $h'$ to the path f. When a sound reaches one ear before it reaches the other, the sound will appear to come from the side at which the arrival is the earlier. When the times of arrival are the same, the sound appears to be centered in the head of the observer.

Figure 2:
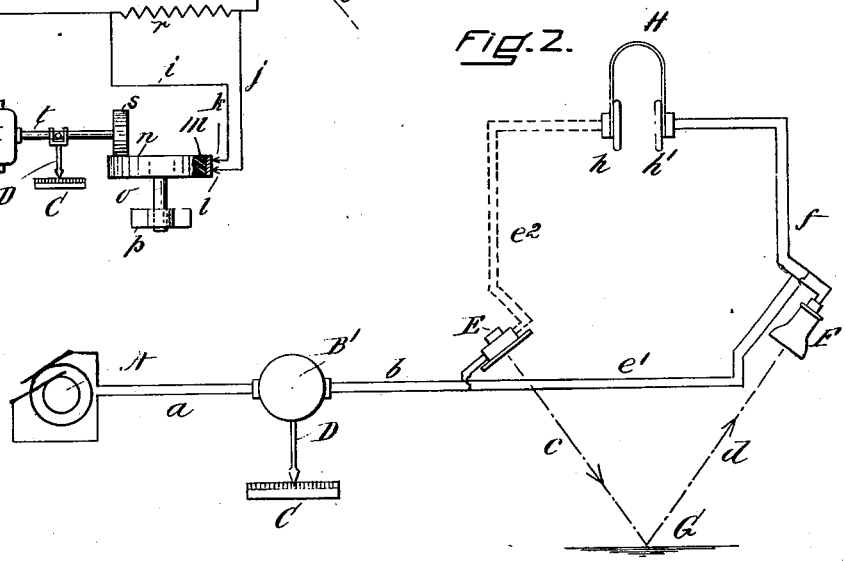

Figure 2 illustrates in schematic form another arrangement of the apparatus which I have used in carrying out my invention. A is the source of electrical power which is carried by wires a, or in any other suitable manner through the modulator B' to the sound producer or oscillator E. By the movement of an arm D, wheel or similar device, the period between variations can be changed at will, and the amount of the interval indicated on scale C, which is calibrated to read directly the depth of water beneath the ship.

A mechanism at B' which may be used in producing the variations is described below. The electrical current waves are transmitted from B' to the submarine sound producer by path b. The sound proceeds from the sound producer E to the ocean bottom G, as by path c and by reflection from G to the submarine sound receiver F as indicated by d. It also proceeds from E to F as indicated by e' or, as an alternative, directly to the indicator H as indicated at $e^2$. The reflected wave actuates sound receiver F and the sound is carried as by a path f to the indicator H. In case path e' is used, the sound waves which pass through e' are also carried by path f to H.

The source of alternating current A may be any form of generator which will produce waves of the required frequency and will be capable of modification so as to create with sufficient rapidity the changes, either in amplitude or frequency which mark the beginning and end of an interval. In my work I have found a pliotron, or similar vacuum tube, when used as generator to be easily and rapidly controlled and, as a consequence, well suited for use with my invention, as indicated below, but any other source of energy may be employed.

Figure 3:
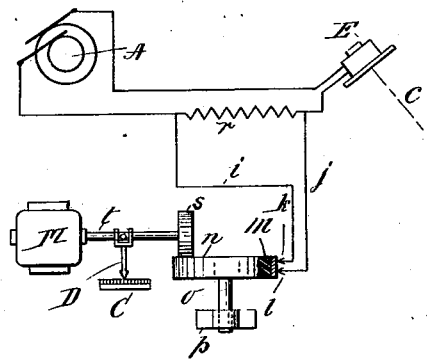
Figure 3 is a detail of a portion of the apparatus shown in Fig. 2.

The device B', used for varying the length of the period between changes, may be of various forms; the method of its operation can be illustrated by the arrangement shown in Figure 3. In this figure, A is the source of alternating current which is delivering an alternating current of a constant frequency, say 1,000 alternations a second, to sound producer E. The resistance r in circuit with the generator A and sound producer E reduces, under normal conditions, the amplitude of the current actuating the sound producer. In the arrangement of my apparatus now being described, it is proposed to increase the volume of the tone created by the sound producer at intervals of variable and controllable length. A simple means is to place a conducting segment or commutator m on the periphery of a wheel and so arrange the circuits that brushes, bearing upon the commutator will produce a short circuit about the resistance at definitely controllable intervals. Such an arrangement is shown in Figure 3. Wires i and j are run from each side of resistance r to brushes k and l and bear upon the periphery of a wheel n of insulating material revolving on shaft o which is supported by block p. The segment of conducting material m is supported across the edge of the wheel n of insulating material and is so arranged relative to brushes k and l that the shunt circuit about r is completed with each revolution of wheel n. Wheel n is driven by wheel s which bears upon its face. Wheel s is connected by a shaft t with motor M, the speed of which is constant. Shaft t is capable of extension so that wheel s can be drawn from the periphery of wheel n to near its center and it carries a pointer D which gives an indication on the scale C. When wheel s is near the periphery of wheel n the time interval between the shunt circuiting of resistance r will be long and this interval will be decreased as wheel s approaches the center of wheel n and the wheel n is driven faster. In this way, the length of time between impulses can be varied by known amounts. If wheel s is moved in one direction or the other until the second impulse through paths e' or $e^2$ of Figure 2 reaches H at the same instant that the first impulse by path $c\ d\ f$ reaches H, the depth of water beneath the ship is known and can be read directly from the pointer D and scale C showing the position of wheel $s$ upon the face of $n$. This will be true for the reason that, as the speed of motor M is known, the position of $s$ on $n$ will give the speed of $n$ and, consequently, the interval between the impulses. Knowing the length of this interval, the depth beneath the ship for different intervals can be readily calibrated.

In what I have said above I have spoken only of the first and second change which mark respectively the beginning and end of an interval. It must be definitely recognized that these changes are following one another in rapid succession, each of which mark the beginning and end of a time interval. What I use in carrying out my invention are the two changes which follow each other and care must be exercised in using the apparatus to make readings in such a way that one change and the next succeeding it only are observed at the indicator.

Figure 4:
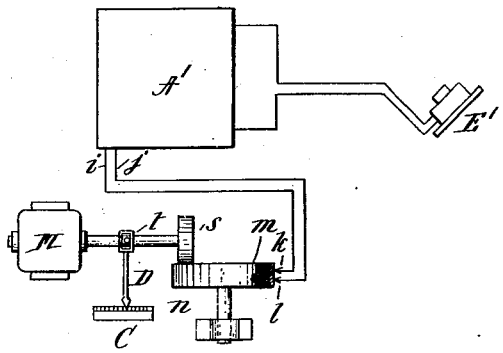
Figure 4 is a modification of said detail.

In another apparatus for carrying out my method similar means of creating a controllable interval between a variation in sound conditions utilizes the type of mechanism as shown in Figure 3, except that in this case the arrangement of the part B' is such as is shown in Figure 4. In this case A' is a vacuum tube oscillator and the wires $i$ and $j$ are taken from the terminals of a capacity or an inductance or both in such a manner that when segment $m$ short circuits them through contacts $k$ and $l$ the normal frequency of the vacuum tube oscillator is slightly changed. The interval between such changes in frequency is carried out and its length measured in precisely the same manner as was described above. In this case the length of interval is changed until the frequency changes of the sound waves arriving at the indicator occur simultaneously.

The indicator which is used with my device is any form which will show when waves of the same character reach it over the two paths at the same time. Thus in the arrangement shown in Figure 1, if the paths are electrical, path $f$ will terminate in a telephone receiver which will be held at one ear of the observer and path $e$ will terminate in another telephone receiver held at the other ear of the observer. In this case, B would be an electrical compensator so designed that the time of travel of the electrical sound waves through the compensator could be made equal to those through path $c\ d\ f$ and this would be apparent by the centering of the sound image in the observer's brain. The compensator would be calibrated to show depths, and such calibration would be based upon the length of the path through the compensator, that is to say, upon the time required for the sound to pass through the compensator. It is obvious that this principle can be carried out in other well known ways. Thus instead of making path $e$ entirely electrical, it can terminate in a telephone receiver or other sound producing device forming a portion of the modulator or compensator B. In this case B will be an air compensator and the path through the compensator from the telephone receiver or other sound producing device to the ear of the listener will be air, the path terminating in an acoustical ear-piece. When an air compensator is used, the compensator B is so designed that the length of the air passage or passages within it can be varied in a well known way by known amounts until the times of arrival of the sounds at the two ears of the observer are synchronous.

The indicators H used in the arrangements shown in Figure 2 may also be one or two telephone receivers. Thus in the method of measuring distances illustrated in Figure 2 there is a well defined maximum intensity of sound when succeeding impulses reach H synchronously. In this case, if path $e'$ is used the sound waves over $e'$ mingle with those arriving over $d$ and a single telephone receiver or two receivers each connected to $f$ would be used. Similarly if path $e^2$ is used, both $e^2$ and $f$ would be connected to the receivers and the observer would change the time between variations until a well defined maximum intensity of sound was heard.

In the method shown in Figures 4 and 5, the arrangement of apparatus is identical. In these cases, however, the phase differences in the sound waves over the two paths will be noted rather more than differences in intensity.

While I have described the indicator as consisting of telephone receivers, any form of visual indicator which will show the synchronous arrival of like waves over the two paths may be used.

What I claim as my invention is,—

1. A device for measuring the depth of water beneath a ship comprising means for indicating phase synchronism of two sets of impulses, variable means for imparting impulses periodically to the water in a direction to be reflected from the sea bottom and for impressing similarly timed impulses on said indicator, means for receiving the reflected impulses and transferring their effect to the said indicator, and means calibrated in units of distance for varying the period of the impulses of said impulse-imparting means.

2. A device for measuring the depth of water beneath a ship comprising means for indicating phase synchronism of two sets of impulses, variable means for imparting impulses periodically to the water in a direction to be reflected from the sea bottom and for impressing similarly timed impulses on said indicator, means for receiving the reflected impulses and transferring their effect to said indicator, and means including means for translating readings of periodicity into units of depth for changing the characteristics of the impulses.

3. A device for measuring the depth of water beneath a ship comprising means for indicating phase synchronism of two sets of impulses, variable means for imparting impulses periodically to the water in a direction to be reflected from the sea bottom and for impressing similarly timed impulses upon said indicator, means for receiving the reflected impulses and transferring their effect to said indicator, and means for changing the characteristics of said impulses at controllable intervals whereby the reception of the characteristics of both sets of impulses may be synchronized, and means for measuring said intervals.

4. In a device for measuring the depth of water beneath a ship comprising means for indicating phase synchronism of two sets of impulses, variable means for imparting impulses periodically to the water in a direction to be reflected from the sea bottom and for impressing similarly timed impulses on said indicator, means for receiving the reflected impulses and transmitting their effect to said indicator, and means including means for translating readings of periodicity into units of depth for varying the emission of said impulses comprising a commutator and means for controlling the speed of said commutator, said commutator comprising means for periodically varying the power output of said impulse-imparting means.

5. In a device for measuring the depth of water beneath a ship, means for indicating phase synchronism of two sets of impulses one of said sets being sent to the water in a direction to be reflected from the sea bottom and the other set to said indicator, the circuit of said imparting means comprising a resistance and means including means for translating readings of periodicity into units of depth for varying the periods of said impulses by varying the resistance in said circuit comprising a commutator and means for controlling its speed, said commutator comprising an electric contact, means connecting said contact in shunt about said resistance, and means whereby the interval between said impulses may be varied by said speed-controlling means and said contact.

6. In a device for measuring the depth of water beneath a ship comprising means for indicating phase synchronism of two sets of impulses, variable means for imparting impulses periodically to the water in a direction to be reflected from the sea bottom and for imparting similarly timed impulses to said indicator, means including means for translating readings of periodicity into units of depth for varying the periodicity of said impulses comprising a motor having an extensible shaft, a friction wheel mounted on said shaft, a second shaft mounted at right angles to said motor shaft and in the same plane therewith and carrying a second friction wheel in engagement with said first wheel whereby the speed of said second wheel may be controlled by changing the length of said motor shaft whereby said first wheel will be moved toward or from the axis of said second wheel, said second wheel carrying an electric contact, and brushes adapted to engage said electric contact whereby the resistance may be thrown or shunted around a circuit controlling said variable impulse means.

RICHARD D. FAY.